(12) United States Patent
Yang et al.

(10) Patent No.: US 8,939,107 B2
(45) Date of Patent: Jan. 27, 2015

(54) CONFINED PULSED LASER DEPOSITION METHOD FOR DEPOSITING METASTABLE THIN FILM

(75) Inventors: Yingling Yang, West Lafayette, IN (US); Gary J. Cheng, West Lafayette, IN (US); Ji Li, West Lafayette, IN (US); Yi Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 197 days.

(21) Appl. No.: 13/037,077

(22) Filed: Feb. 28, 2011

(65) Prior Publication Data
US 2011/0210479 A1 Sep. 1, 2011

Related U.S. Application Data

(60) Provisional application No. 61/308,656, filed on Feb. 26, 2010.

(51) Int. Cl.
*B05C 9/12* (2006.01)
*B05C 11/00* (2006.01)
*B23K 26/06* (2014.01)
(Continued)

(52) U.S. Cl.
CPC .......... *B23K 26/063* (2013.01); *B23K 26/0661* (2013.01); *B23K 26/0853* (2013.01); *B23K 26/324* (2013.01); *B23K 26/34* (2013.01); *B23K 26/36* (2013.01); *B23K 26/4025* (2013.01); *B23K 26/3266* (2013.01)
USPC ............ 118/620; 118/600; 118/640; 427/596

(58) Field of Classification Search
CPC ............. B23K 26/063; B23K 26/0661; B23K 26/0853; B23K 26/4025; B23K 26/34; B23K 26/36; B23K 26/324; B23K 26/127
USPC ........................... 118/600, 620, 640; 427/596
See application file for complete search history.

(56) References Cited

U.S. PATENT DOCUMENTS 5,690,794 A * 11/1997 Molchanov et al. ...... 204/157.47
5,714,762 A * 2/1998 Li et al. ...................... 250/559.2

OTHER PUBLICATIONS

Zhibin, M; Jianhua, W., Jun, W.; Synthesis of Carbon Films with Diamond Phase from Methanol Solution by Pulsed Arc Discharge, Diamond and Related Materials 13 (10), 1889-1891, Elsevier, 2004.

(Continued)

*Primary Examiner* — Dah-Wei D Yuan
*Assistant Examiner* — Stephen Kitt
(74) *Attorney, Agent, or Firm* — Taft Stettinius & Hollister LLP; Anthony P. Filomena

(57) ABSTRACT

A confined pulsed laser deposition method and apparatus that includes an ablative coating between a transparent confinement layer and a backing plane, and a laser beam directed through the confinement layer to ablate the coating at generally ambient temperature and pressure, and using laser induced pressure to synthesize metaphase from the ablative coating. For example, diamond phase carbon can be synthesized from a graphite coating. The laser beam can be directed through a focus lens to control the final spot size, or through a beam diffuser to make the intensity more uniform. An XYZ-stage can position a desired target area of the ablative coating to be irradiated by the laser beam. The laser beam can have an intensity of less than about 6 GW/cm$^2$, or less than about 4 GW/cm$^2$. The laser beam can have an excitation wavelength of about 568 nm.

10 Claims, 8 Drawing Sheets

(51) Int. Cl.
B23K 26/08 (2014.01)
B23K 26/32 (2014.01)
B23K 26/34 (2014.01)
B23K 26/36 (2014.01)
B23K 26/40 (2014.01)

(56) References Cited

OTHER PUBLICATIONS

Osswald, S., Mochalin, V.N., Havel, M., Yushin, G., Gogotsi, Y., Phonon Confinement Effects in the Raman Spectrum of Nanodiamond, Physical Review B80(7), 075419-1-075419-9, The American Physical Society, 2009.

Bradac, C.; Gaebel, T.; Chan, N.; Rabeau, J. R.; Barnard, A. S., Prediction and Measurement of the Size-Dependent Stability of Fluorescence in Diamond over the Entire Nanoscale. Nano Letters 2009, 9 (10), 3555-3564.

Das, D.; Singh, R. N., A review of nucleation, growth and low temperature synthesis of diamond thin films. International Materials Reviews 2007, 52 (1), 29-64.

Balasubramanian, G.; Chan, I. Y.; Kolesov, R.; Al-Hmoud, M.; Tisler, J.; Shin, C.; Kim, C.; Wojcik, A.; Hemmer, P. R.; Krueger, A.; Hanke, T.; Leitenstorfer, A.; Bratschitsch, R.; Jelezko, F.; Wrachtrup, J., Nanoscale imaging magnetometry with diamond spins under ambient conditions. Nature 2008, 455 (7213), 648-652.

Aharonovich, I.; Castelletto, S.; Simpson, D. A.; Stacey, A.; McCallum, J.; Greentree, A. D.; Prawer, S., Two-Level Ultrabright Single Photon Emission from Diamond Nanocrystals. Nano Letters 2009, 9 (9), 3191-3195.

Bhattacharyya, S.; Henley, S. J.; Mendoza, E.; Gomez-Rojas, L.; Allam, J.; Silva, S. R. P., Resonant tunnelling and fast switching in amorphous-carbon quantum-well structures. Nature Materials 2006, 5 (1), 19-22.

Le Guillou, C.; Brunet, F.; Irifune, T.; Ohfuji, H.; Rouzaud, J. N., Nanodiamond nucleation below 2273 K at 15 GPa from carbons with different structural organizations. Carbon 2007, 45 (3), 636-648.

Greiner, N. R.; Phillips, D. S.; Johnson, J. D.; Volk, F., Diamonds in Detonation Soot. Nature 1988, 333 (6172), 440-442.

Angus, J. C.; Will, H. A.; Stanko, W. S., Growth of Diamond Seed Crystals by Vapor Deposition. Journal of Applied Physics 1968, 39 (6), 2915-2922.

Bundy, F. P.; Hall, H. T.; Strong, H. M.; Wentorf, R. H., Man-Made Diamonds. Nature 1955, 176 (4471), 51-55.

Niwase, K.; Nakamura, K. G.; Yokoo, M.; Kondo, K.; Iwata, T., Pathway for the Transformation from Highly Oriented Pyrolytic Graphite into Amorphous Diamond. Physical Review Letters 2009, 102 (11).

Lau, D. W. M.; McCulloch, D. G.; Taylor, M. B.; Partridge, J. G.; McKenzie, D. R.; Marks, N. A.; Teo, E. H. T.; Tay, B. K., Abrupt stress induced transformation in amorphous carbon films with a highly conductive transition phase. Physical Review Letters 2008, 100 (17).

Voevodin, A. A.; Donley, M. S., Preparation of amorphous diamond-like carbon by pulsed laser deposition: A critical review. Surface & Coatings Technology 1996, 82 (3), 199-213.

Fabbro, R.; Fournier, J.; Ballard, P.; Devaux, D.; Virmont, J., Physical Study of Laser-Produced Plasma in Confined Geometry. Journal of Applied Physics 1990, 68 (2), 775-784.

Chu, P. K.; Li, L. H., Characterization of amorphous and nanocrystalline carbon films. Materials Chemistry and Physics 2006, 96 (2-3), 253-277.

Bundy, F. P.; Bassett, W. A.; Weathers, M. S.; Hemley, R. J.; Mao, H. K.; Goncharov, A. F., The pressure-temperature phase and transformation diagram for carbon; Updated through 1994. Carbon 1996, 34 (2), 141-153.

Ferrari, A. C.; Robertson, J., Resonant Raman spectroscopy of disordered, amorphous, and diamondlike carbon. Physical Review B 2001, 64 (7).

Gogotsi, Y. G.; Kailer, A.; Nickel, K. G., Pressure-induced phase transformations in diamond. Journal of Applied Physics 1998, 84 (3), 1299-1304.

Chen, Z. Y.; Zhao, J. P.; Yano, T.; Ooie, T.; Yoneda, M.; Sakakibara, J., Observation of sp(3) bonding in tetrahedral amorphous carbon using visible Raman spectroscopy. Journal of Applied Physics 2000, 88 (5), 2305-2308.

Schindler, T. L.; Vohra, Y. K., A Micro-Raman Investigation of High-Pressure Quenched Graphite. Journal of Physics-Condensed Matter 1995, 7 (47), L637-L642.

Ferrari, A. C.; Robertson, J., Interpretation of Raman spectra of disordered and amorphous carbon. Physical Review B 2000, 61 (20), 14095-14107.

Shroder, R. E.; Nemanich, R. J.; Glass, J. T., Analysis of the Composite Structures in Diamond Thin-Films by Raman-Spectroscopy. Physical Review B 1990, 41 (6), 3738-3745.

Ferreira, N. G.; Abramof, E.; Corat, E. J.; Trava-Airoldi, V. J., Residual stresses and crystalline quality of heavily boron-doped diamond films analysed by micro-Raman spectroscopy and X-ray diffraction. Carbon 2003, 41 (6), 1301-1308.

Varnin, V. P.; Laptev, V. A.; Ralchenko, V. G., The state of the art in the growth of diamond crystals and films. Inorganic Materials 2006, 42, S1-S18.

* cited by examiner

CONFINED PULSED LASER DEPOSITION METHOD FOR DEPOSITING METASTABLE THIN FILM

CROSS-REFERENCE TO RELATED APPLICATIONS

This application claims the benefit of U.S. Provisional Application Ser. No. 61/308,656, filed on Feb. 26, 2010, entitled "Confined Pulsed Laser Deposition Method for Depositing Metastable Thin Film" which is incorporated herein by reference.

BACKGROUND

The present invention relates to synthesis techniques of metastable material using confined laser ablation, and provides an exemplary disclosure of techniques to fabricate diamond and transparent conductive amorphous carbon at room temperature.

Diamond and related materials have attracted renewed interest in recent years due to their outstanding mechanical, electronic and optical properties. New promising applications have been identified, including spin imaging, single photon emitters and high-speed electronic devices. However, these materials are not easy to synthesize, because the activation energy of graphite-diamond transition is so great that diamond synthesis requires extreme environments, such as high temperature and high pressure. Various synthesis techniques have been developed for obtaining metastable carbon materials, i.e. explosive detonation, chemical vapor deposition, and high-temperature high-pressure processing. However, the fabrication processes of these techniques are usually slow, complex and expensive due to the requirements of maintaining extreme environments. Some goals in the research of diamond and related materials are to lower synthesis temperatures, increase growth rates and reduce fabrication costs.

In addition, the details of the carbon transformation process still remain unclear in several respects. For example, there is a debate concerning the transition process between graphite-like carbon and diamond-like carbon. Some considered that the boundary between them was diffuse because of the amorphous nature of these materials, while others have argued that there is an abrupt transition between the two amorphous phases.

SUMMARY

A method is disclosed for depositing diamond-like and graphite-like carbon and many other metaphase thin films. The method provides a low cost, rapid and energy saving approach by avoiding high temperature processing and complex systems. The procedure is relatively easy to set up, and films can be quickly obtained just after a laser shot lasting several tens of nanoseconds. This technique is somewhat analogous to pulse laser deposition and thus is called confined pulse laser deposition. A difference is that during deposition, a transparent confinement layer is used to impede the expansion of a laser-induced plasma plume. Although the synthesis can be performed at room temperature and atmospheric pressure, the confinement of the hot plume creates a localized high-temperature and high-pressure condition, which is advantageous for synthesizing polycrystalline thin film, especially for metastable materials that prefer high-pressure and high-temperature ambient conditions, such as diamond and related materials. The technique combines the advantages of pulse laser deposition and laser shock peening. Especially for the synthesis of diamond phase carbon, this method can take advantage of both the laser induced strong shock wave and the laser created high-energy disordered precursor. As a result, both graphite phase with metallic luster and diamond phase with high transparency can be prepared. Even the laser intensity used here (<6 GW/cm$^2$) is far lower than the criterion for pulse laser deposition (50 GW/cm$^2$ for 1064 nm laser). This method provides a fast, clean, low cost and energy-saving technique by being able to avoid high temperature processing and complex vacuum systems.

A confined pulsed laser deposition method is disclosed that includes placing an ablative coating between a transparent confinement layer and a backing plane, directing a laser beam through the transparent confinement layer to irradiate and ablate the ablative coating at generally ambient room temperature and pressure, confining the ablative coating using the confinement layer, and synthesizing a metaphase from the ablative layer using laser induced pressure between the confinement layer and the backing plane. The ablative coating can be a graphite coating that is synthesized into diamond phase carbon, or can be a metal or thin film coating. The method can also include directing the laser beam through a focus lens to control the final spot size of the laser beam on the ablative coating, or directing the laser beam through a beam diffuser to make the laser beam intensity more uniform. The method can also include using an XYZ-stage to position a desired target area of the ablative coating to be irradiated by the laser beam. The laser beam can have an intensity of less than about 6 GW/cm$^2$, or less than about 4 GW/cm$^2$. The laser beam can have an excitation wavelength of about 568 nm.

An apparatus for performing confined pulsed laser deposition at generally ambient room temperature and pressure is disclosed. The apparatus includes a backing plane, an ablative coating placed on the backing plane and a transparent confinement layer attached to the backing plane, where the ablative coating is sandwiched between the backing plane and the transparent confinement layer. The apparatus also includes a laser beam that irradiates and ablates the ablative coating through the transparent confinement layer, and induces a high-pressure between the confinement layer and the backing plane to synthesize a metaphase from the ablative layer. The confinement layer and the backing plane confine the ablative coating to cause the high-pressure between the confinement layer and the backing plane. The laser beam is used at generally ambient room temperature and pressure. The ablative coating can a graphite coating that transforms into diamond phase carbon. The ablative coating can be a metal or a thin film coating. The apparatus can also include a focus lens, where the laser beam is directed through the focus lens to control the final spot size of the laser beam on the ablative coating. The apparatus can also include a beam diffuser, where the laser beam is directed through the beam diffuser to make the laser beam intensity more uniform. The apparatus can also include an XYZ-stage to position a desired target area of the ablative coating to be irradiated by the laser beam. The laser beam can have an intensity of less than about 6 GW/cm$^2$, or less than about 4 GW/cm$^2$. The laser beam can have an excitation wavelength of about 568 nm.

DESCRIPTION OF EXEMPLARY EMBODIMENTS

Figure 1:
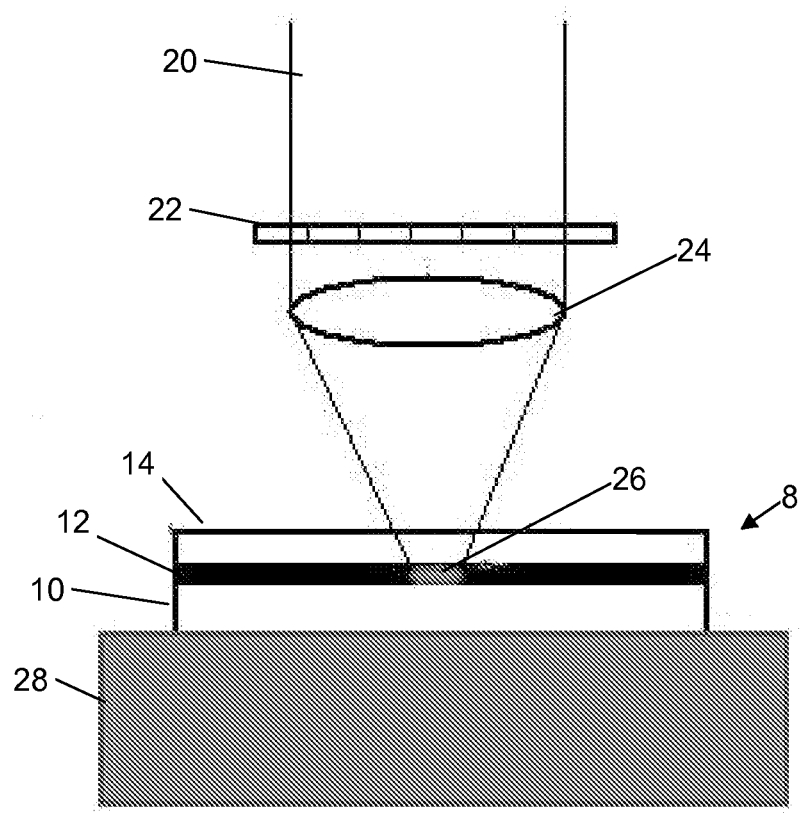
FIG. 1 is a schematic diagram of an exemplary confined pulse laser deposition setup.

For the purposes of promoting an understanding of the principles of the novel technology, reference will now be made to the embodiments described herein and illustrated in the drawings and specific language will be used to describe the same. It will nevertheless be understood that no limitation of the scope of the novel technology is thereby intended, such alterations and further modifications in the illustrated devices and methods, and such further applications of the principles of the novel technology as illustrated therein being contemplated as would normally occur to one skilled in the art to which the novel technology relates.

Confined pulse laser deposition can synthesize diamond phase carbon material at room temperature. The technique combines the advantages of both laser induced strong shock wave and laser created high-energy disordered precursor by utilizing a transparent layer to confine laser ablation. Semi-transparent graphite phase with metallic luster and transparent diamond phase with high electrical resistance were obtained under a lower laser intensity (<6 GW/cm$^2$) at an excitation wavelength of 568 nm. Electrical measurement and Raman spectra characterization showed that there is a shape transition between graphite phase and diamond phase when laser intensity is near 3.7 GW/cm$^2$.

The concept of confined pulse laser deposition is illustrated in FIG. 1. A frame (not shown) is fixed to a sample assembly 8 that includes a backing plate 10, a ablative layer 12 and a transparent confinement layer 14. The frame clamps the backing plate 10 to the confinement layer 14 with the ablative layer sandwiched between the backing plate 10 and the confinement layer 14. The ablative layer 12 can be graphite, metal or other thin film coating that can absorb laser energy. The transparent confinement layer 14 can be made of various materials transparent to the laser, for example glass or sapphire. The ablative layer 12 will be transformed to a metaphase after confined pulsed laser deposition. The frame can include screws or other fastening mechanism to provide close contact between the confinement layer 14 and the backing plate 10. The space between the confinement layer 14 and the ablative layer 12 can preferably be adjusted by the fastening mechanism and/or by inserting a separator, for example aluminum foil. The sample assembly 8 can be placed on an XYZ-stage 28 that can position the sample assembly 8 in a desired location.

The mechanism for generating pressure is similar to that of laser shock peening, which is a well-known technique for high pressure processing of metallic components. In operation, a laser beam 20 is directed to pass through a focus lens 24 that controls the final spot size of the laser beam 20. Optionally, a beam diffuser or mask 22 can be placed in the optical path of the laser beam 20 to make the intensity distribution of the laser beam 20 more uniform. When the laser beam 20 transmits through the transparent confinement layer 14 and irradiates the target 26 of the ablative layer 12, the ablative layer 12 vaporizes and ionizes into hot plasma. The ionized plasma gas is confined by the confinement layer 14 and generates a strong shock wave, which provides a sufficient local pressure to synthesize metaphase from the ablative layer 12. For example, when the ablative layer 12 is a graphite coating, sufficient local pressure is generated to synthesize diamond phase carbon from the graphite coating.

Confined pulse laser deposition can have several advantages over other synthesizing techniques. For example, the laser source 20 can be highly controllable and reproducible, and operating conditions can be easily changed. The laser-induced pressure in the confined configuration is four to ten times greater than the pressure in conventional pulse laser deposition. The focus lens 24 and the XYZ-stage 28 allow careful control over the target area 26 of the ablative layer 12 to be irradiated by the laser beam 20. This technique can be used in combination with other techniques, such as by adding another laser for heating, inserting a mask into the laser beam for patterning, or utilizing alternative atmosphere environments for protection.

The following results were obtained when using a graphite coating as the ablative layer. The film synthesized by confined pulse laser deposition at low laser intensity is mostly semi-transparent amorphous carbon. This transparent amorphous carbon can exist in different kinds of binding frameworks and can exhibit great versatility of properties. It is generally agreed that amorphous carbon with high sp$^3$ hybridized bonds is closer to diamond (diamond like carbon), and that with high sp$^2$ hybridized bonds is closer to graphite (graphite like carbon). The properties of amorphous carbon are not a simple linear mixture between the properties of graphite and diamond. For example, by adjusting the depositing parameters, we observed graphite like carbon at certain ranges that show a good combination of high electrical conduction and optical transparency.

Figure 2:
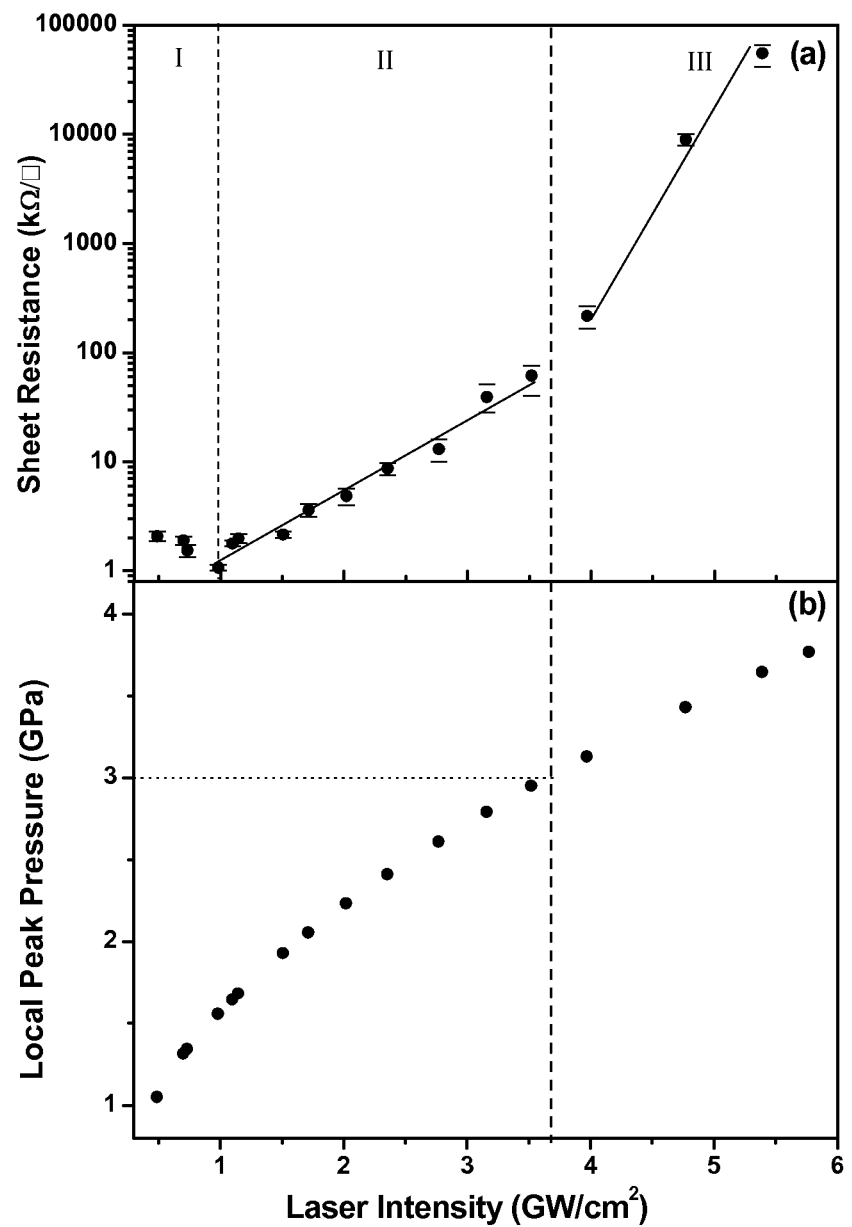
FIG. 2A is a plot of sheet resistance of carbon film as a function of laser intensity.
FIG. 2B is a plot of local peak pressure as a function of laser intensity.

The electrical properties of these carbon films were investigated because electrical resistance can provide important information regarding phase transition for carbon materials. FIG. 2A plots the sheet resistance of carbon films as a function of laser intensity. This plot shows three stages in the trajectory of resistance from low laser intensity to high laser intensity. In stage I, with laser intensity below 1 GW/cm$^2$, resistance decreases with increasing laser intensity. In stage II, with intermediate laser intensity between 1 GW/cm$^2$ and 3.7 GW/cm$^2$, resistance increases exponentially with laser intensity. In stage III, with laser intensity greater than 3.7

GW/cm$^2$, a more dramatically exponential increase in resistance is observed. It should be noted that there can be several competitive mechanisms involved in the process of increasing laser intensity. The increase of laser intensity results in a higher local pressure, which may reduce the electrical resistance because of densification of the carbon film. The densification increases hopping that is driven by stress-induced overlap of the localized sp$^2$ wave functions. The increase of laser intensity also induces a higher speed carbon plume with higher energy which is propitious to form higher fractions of sp$^3$ bonding and increase the electrical resistance of the carbon film. In addition, if the pressure is high enough, it will induce a transformation from graphite phase to diamond phase which causes an increase in electrical resistance. The gradual resistance reduction at stage I may correspond to the first mechanism dominating this stage. Exponential increase of resistance at stage II may be the consequence of the second mechanism. The different rate of resistance increase between stage II and stage III may indicate a phase transition near 3.7 GW/cm$^2$. The higher resistance phase can be attributed to diamond phase carbon, and the lower resistance phase can be attributed to graphite-like carbon phase.

According to the model reported in Fabbro et al., "Physical Study of Laser-Produced Plasma in Confined Geometry." *Journal of Applied Physics* 1990, 68 (2), 775-784, the local pressure can be evaluated under the confined configuration which is shown in FIG. 2B. FIG. 2B plots the local peak pressure as a function of laser intensity. The computation shows that a laser intensity of 3.7 GW/cm$^2$ can induce a local pressure of about 3 GPa, which is consistent with the hydrostatic pressure value (approximately 3 GPa) that can cause a transformation from graphite to diamond at room temperature. This value is also consistent with the biaxial stress value (around 4.5 GPa) that can cause the onset of the transition between graphite-like carbon and diamond-like carbon.

Figure 3A:
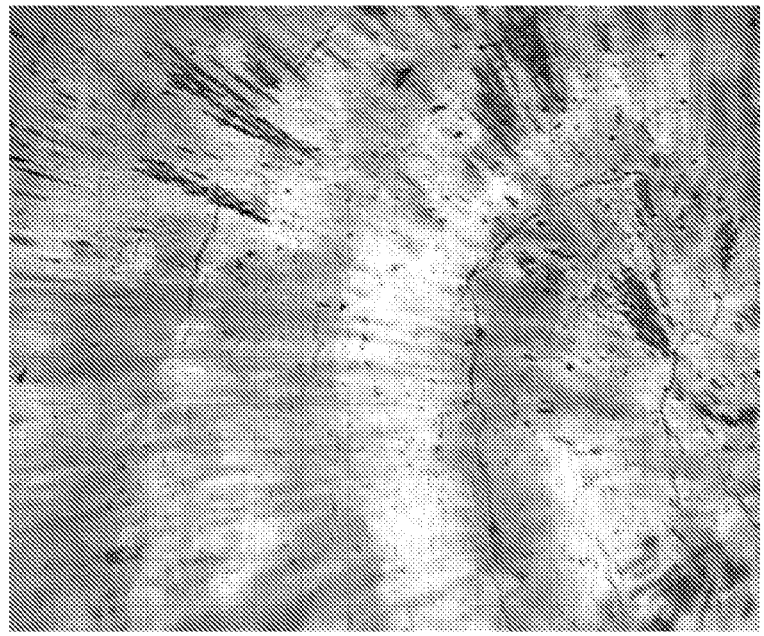
FIG. 3A is an optical picture of graphite phase carbon film.
Figure 3B:
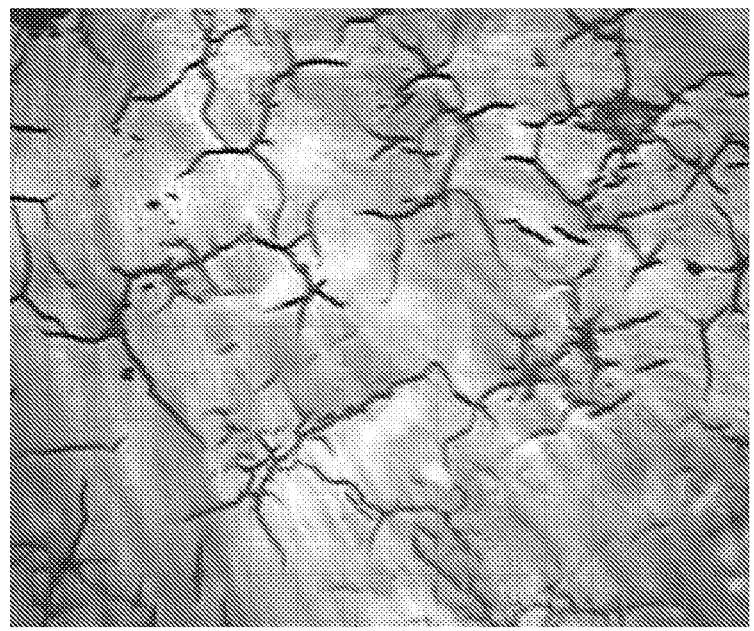
FIG. 3B is an optical picture of diamond phase carbon film.

The difference between the two phases can be clearly observed by the naked eye. When the laser intensity is below the critical value, the semi-transparent carbon films shows golden metal luster, which is similar to the luster of HOPG (highly oriented polycrystalline graphite). As the laser intensity increases above the critical value, the carbon films become highly transparent and show a slight silver luster. FIG. 3 shows typical optical microscope images of carbon fabricated at low and high laser intensity, respectively. FIG. 3A is an optical picture of graphite phase carbon film, and FIG. 3B is an optical picture of diamond phase carbon film. The differences between the two phases are obvious.

The transition of carbon film during confined pulse laser ablation was further demonstrated by Raman spectroscopy measurement. Though there are still debates on the exact details of the vibration modes, Raman spectroscopy is a way to distinguish the bonding type and domain size in carbon materials, because Raman measurement is nondestructive and very sensitive to the changes of microstructure. FIG. 4 shows representative Raman spectra of carbon films for an excitation wavelength of 568 nm and different laser intensities ranging from 1.7 to 5.8 GW/cm$^2$.

It was observed that Raman spectra obtained at low laser intensities exhibit different characteristic peaks compared with those at high laser intensities. When the laser intensity is below the critical value (FIGS. 4A and 4B), the major bands lie at around 1560, 1340 and 1240 cm$^{-1}$, respectively. Generally, the Raman peak around 1560 cm$^{-1}$ was labeled as the G-peak, and the Raman peak at around 1340 cm$^{-1}$ was labeled as the D-peak. The origin of the Raman peak at around 1242 cm$^{-1}$ is unclear. Both the G-peak and D-peak are common features of amorphous carbon and ascribed to sp$^2$ bonds. The G-peak represents the bond-stretching mode of sp$^2$ atoms in both rings and chains. The D-peak reflects disorder and is due to the breathing modes of sp$^2$ rings. The intensity ratio, I(D)/I(G), is widely used to estimate the sp$^2$ cluster size and has been successfully used in different carbon materials, including amorphous carbon graphite nanocrystal. For yellow-green wavelength excitation, it has been demonstrated that I(D)/I(G) of amorphous carbon decreases with increasing fractions of sp$^3$ bonding.

Figure 5:
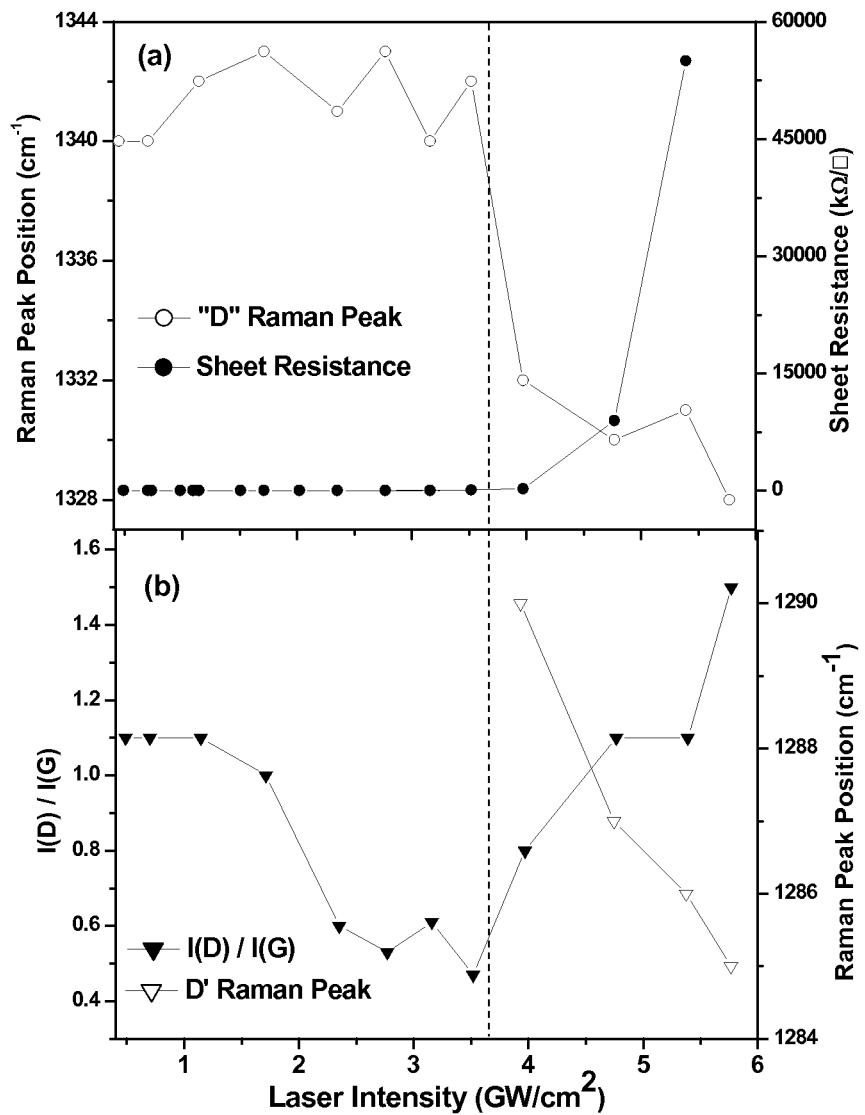
FIG. 5A includes a plot of the position of the D Raman peak as a function of laser intensity, and a plot of sheet resistance as a function of laser intensity.
FIG. 5B includes a plot of the intensity ratio between the D Raman peak and the G Raman peak as a function of laser intensity, and a plot of the 1286 cm$^{-1}$ or D' Raman peak as a function of laser intensity.

FIG. 5B plots the intensity ratio between the D-peak and the G-peak as a function of laser intensity. When laser intensity is below 3.7 GW/cm$^2$, the intensity ratio I(D)/I(G) decreases with laser intensity, which can be attributed to the reduction of the sp$^2$ fraction in amorphous carbon film. This phenomenon is consistent with the fact that the electrical resistance and optical transparency of carbon film increases with laser intensity.

Figure 4A:
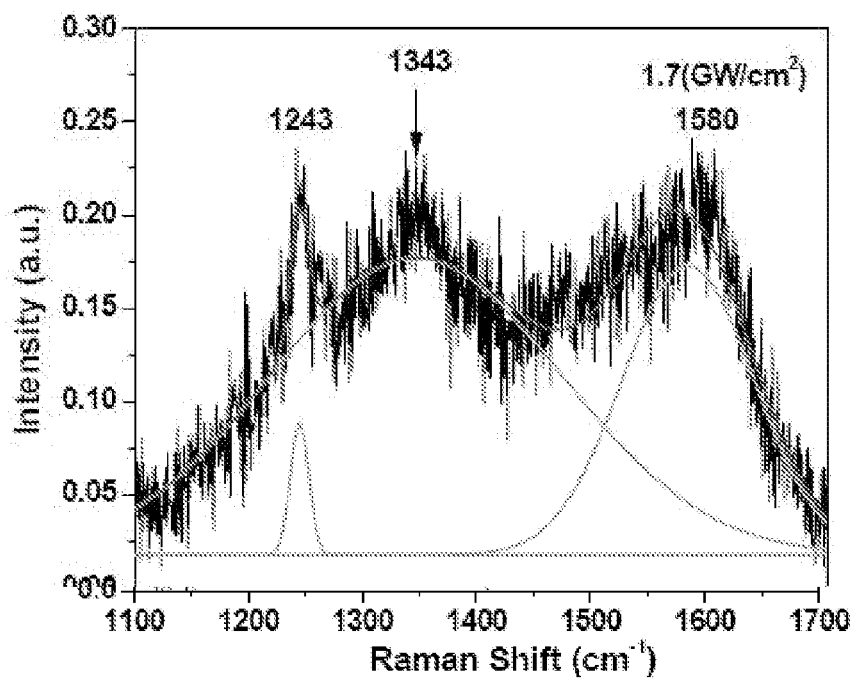
FIG. 4A is the Raman spectra of carbon films at a laser intensity of 1.7 GW/cm$^2$ for an excitation wavelength is 568 nm.
Figure 4B:
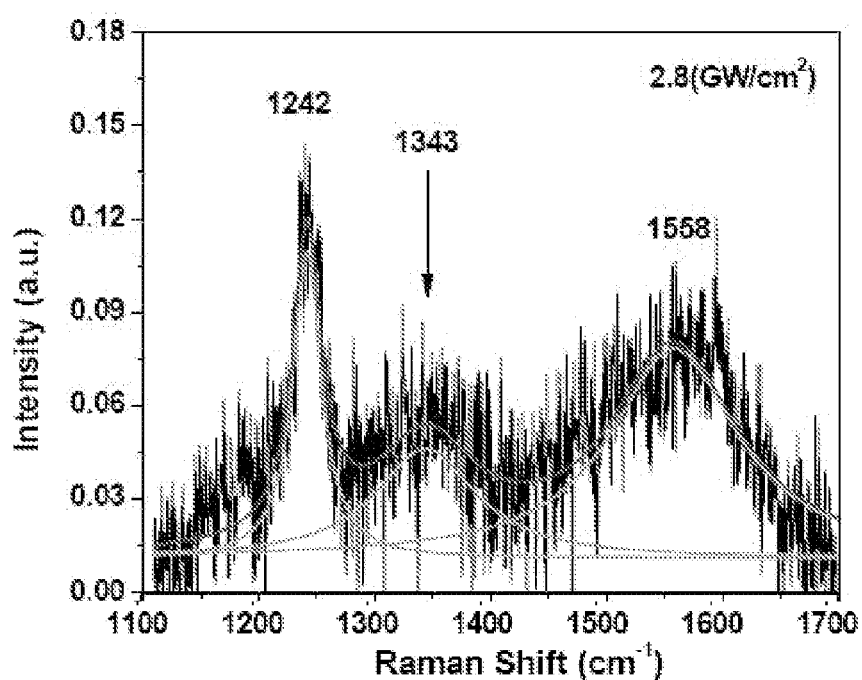
FIG. 4B is the Raman spectra of carbon films at a laser intensity of 2.8 GW/cm$^2$ for an excitation wavelength is 568 nm.
Figure 4C:
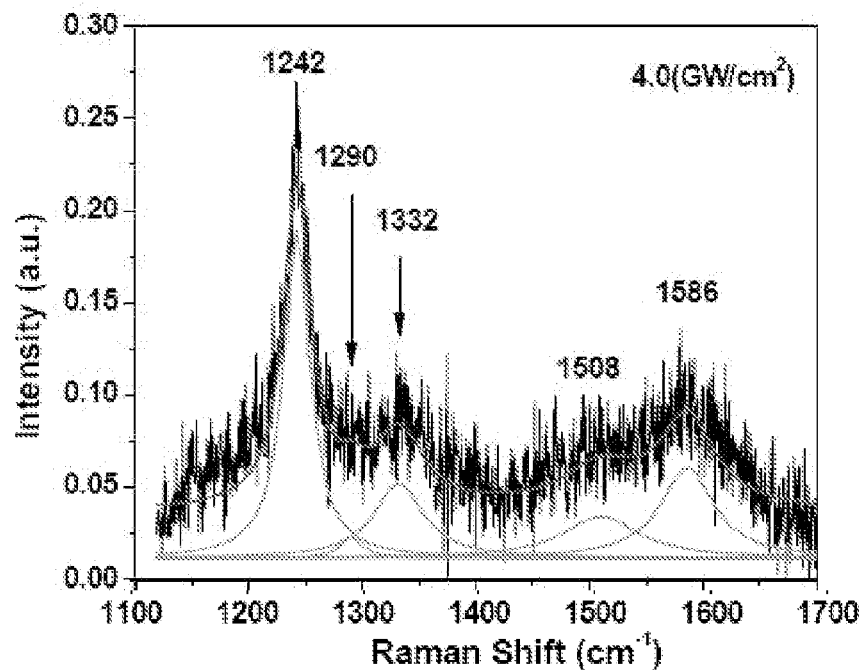
FIG. 4C is the Raman spectra of carbon films at a laser intensity of 4.0 GW/cm$^2$ for an excitation wavelength is 568 nm.
Figure 4D:
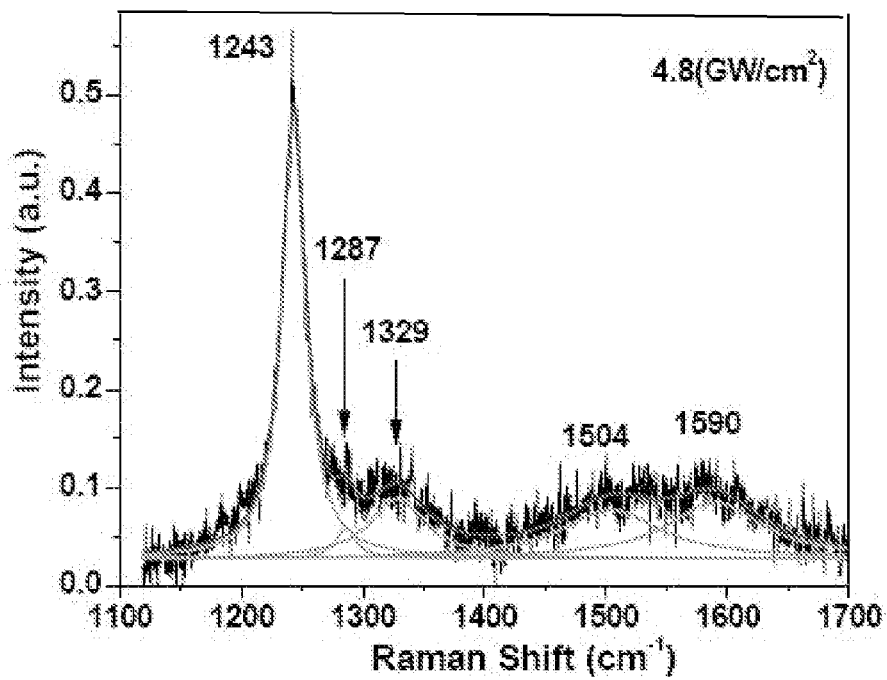
FIG. 4D is the Raman spectra of carbon films at a laser intensity of 4.8 GW/cm$^2$ for an excitation wavelength is 568 nm.
Figure 4E:
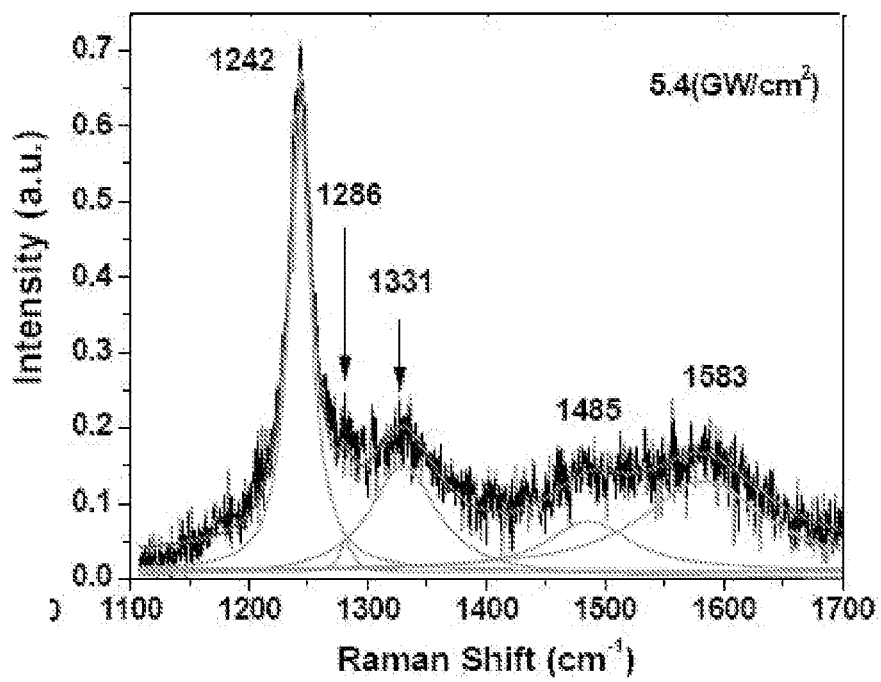
FIG. 4E is the Raman spectra of carbon films at a laser intensity of 5.4 GW/cm$^2$ for an excitation wavelength is 568 nm.
Figure 4F:
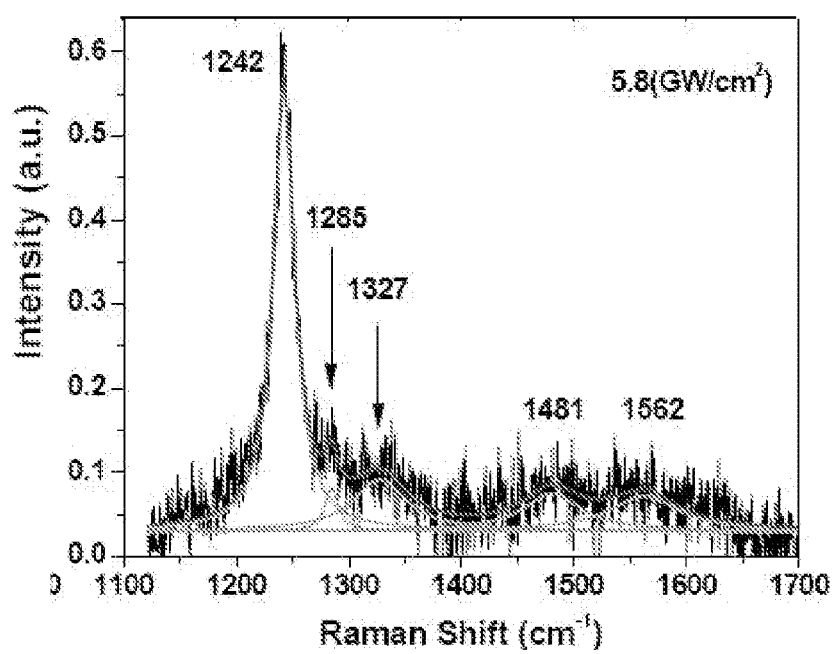
FIG. 4F is the Raman spectra of carbon films at a laser intensity of 5.8 GW/cm$^2$ for an excitation wavelength is 568 nm.

When the laser intensity is above 3.7 GW/cm$^2$, the Raman spectra (FIGS. 4C-F) show several different bands compared with those in the low laser intensity region (FIGS. 4A-B). These additional Raman bands are centered at around 1332 cm$^{-1}$, 1286 cm$^{-1}$ and 1490 cm$^{-1}$, respectively.

The broad and faint Raman band around 1332 cm$^{-1}$ is due to the stretching of sp$^3$ bonds and can be used to characterize nano-diamond. Due to size confinement effects at nanoscale, the position of the 1332 cm$^{-1}$ band can be downshifted by several cm$^{-1}$, and the bandwidth can be as large as several tens of cm$^{-1}$. For convenience, we still label this diamond peak as D-peak, even though we believe the band is not a D-peak because of different peak position, bandwidth and behavior.

The Raman peak around 1286 cm$^{-1}$ is typically observed in nano-diamond fabricated by different methods and also regarded as a feature associated with the sp$^3$ bonding. However, the detailed attribution of the band is still a matter of debate. Several groups considered the presence of hexagonal diamond responsible for this Raman band. However, other groups assigned this band to amorphous diamond, because the maximum of VDOS (vibrational density of states) occurs in the region from 1200 cm$^{-1}$ to 1300 cm$^{-1}$ according to theory. Amorphous diamond can be viewed as a mixture of cubic diamond and hexagonal diamond in various ways at the nanoscale level. Thus, there is no intrinsic contradiction between the two opinions. Osswald et al., "Phonon confinement effects in the Raman spectrum of nanodiamond," *Physical Review B* 2009, 80 (7), stated that this peak results directly from the confined size effects of nano-diamond crystals. This Raman band may be related to the defect or disorder modes in the diamond phase. The Raman peak around 1286 cm$^{-1}$ is labeled as D' peak.

The Raman peak around 1490 cm$^{-1}$ has been attributed to diamond structure containing sp$^2$ carbon. This Raman band was observed in chemical vapor deposition (CVD) synthesizing diamond. The appearance of these modes associated with the diamond phase suggests the high transform efficiency of confined pulse laser deposition, because the diamond modes cannot be observed in weakly transformed diamond under the visible excitation due to the fact that the Raman cross-section of sp$^2$ phase is considerably greater than that of the diamond phase.

FIG. 5A shows the relation between the position of the D-Raman-peak and laser intensity. A sudden downshift of the D-peak position was clearly observed in the vicinity of the critical laser intensity. The intensity of this Raman band shows different trends below and above the critical laser intensity. The intensity ratio between the D-peak and the G-peak is plotted as a function of laser intensity in FIG. 5B. FIG. 5B shows a generally decreasing relation between I(D)/

I(G) and laser intensity below the critical laser intensity, and a generally increasing relation between I(D)/I(G) and laser intensity above the critical laser intensity. We note that I(D)/I(G) associated to $sp^2$ defect mode of amorphous carbon decreases with increasing fractions of $sp^3$ bonding for yellow-green wavelength excitation. It also has been reported that the $sp^2$ defect mode will disappear in amorphous carbon with a high fraction of $sp^3$ bonding. Considering the fact that higher laser intensity generates films with a higher fraction of $sp^3$ bonding, the conclusion can be drawn that the 1332 cm$^{-1}$ Raman peak near the D region is the characteristic peak of diamond phase and not the defect mode of graphite phase. The line width of this peak, $\Gamma$, decreases with laser intensity, which indicates the cluster size of the diamond phase increases. Osswald et al. suggested that there is a relation between nano cluster size (L) of diamond phase and the line width ($\Gamma$) of the 1332 cm$^{-1}$ Raman peak:

$$\Gamma = A + \frac{B}{L^2}$$

where A=11.0 cm$^{-1}$ and B=491.25 cm$^{-1}$nm$^2$. A simple calculation reveals that the average size of diamond phase cluster ranges from 2.5 nm to 5 nm. HRSEM measurement demonstrated that the cluster size of diamond phase is below 10 nm. However, accurate values cannot be achieved in HRSEM because of the very small size and the high electrical resistance.

The position of the D' Raman peak band versus laser intensity is also plotted in FIG. 5B. This Raman band only shows up when the laser intensity is higher than the critical value. As the laser intensity increases, the peak position of this band decreases and the peak intensity increases, which may suggest the defect or disorder in diamond phase increases with laser intensity. All of these results confirm that there is a phase transition from graphite like carbon to diamond phase carbon in the vicinity of the critical laser intensity.

The physical processes of confined pulse laser deposition can be described in three stages. In the first stage, the target is ablated by pulsed laser radiation; the graphite coating vaporizes immediately and creates a dense plasma plume which continues absorbing the laser energy. The heating and condensing of the plasma plume results in the formation of a variety of carbon species including clusters, single atoms, or ions. Kinetic energies of these carbon species are much higher than thermal. As the plasma pressure goes to its peak, the carbon species may aggregate and form carbon clusters by collision or diffusion. In the second stage, the plasma experiences an adiabatic cooling and maintains the applied pressure after the switch-off of the laser. The third stage is the adiabatic cooling of the recombined plasma until it completely cools down.

Figure 6:
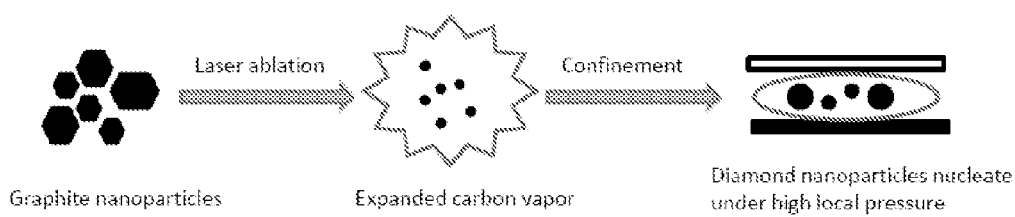
FIG. 6 is a schematic diagram of a forming process for diamond phase carbon.

The synthesis of diamond phase carbon under such low laser intensity (<6 GW/cm$^2$) in this process is a significant advantage. It is well known that 50 GW/cm$^2$ (related to Nagel criterion) is the threshold to grow diamond like carbon in the ablation of graphite (for 1064 nm wavelength laser). Furthermore, the nucleation of nano-diamond usually needs high temperature (>1500° C.) and high pressure (>10 GPa). However, this method produced diamond phase carbon at room temperature and under relatively low local pressure (<4 GPa). The vaporization and ionization of the graphite coating destroys the crystalline order of the graphite and greatly reduces the dynamic barrier for synthesizing diamond phase carbon (see FIG. 6). Actually, the pressures and temperatures of diamond synthesis are usually far above those of the graphite-diamond equilibrium boundary, because the activation energy of transformation is great and is the major barrier for diamond synthesis. Previous work has shown that disordered carbon precursors are preferable to increase transformation rates and lower the minimum pressure and temperature conditions of diamond synthesis. This method takes advantage of both laser created high-energy carbon precursors and laser induced strong shock waves. As a consequence, both the threshold of laser intensity and the temperature was greatly reduced for forming the diamond phase. Therefore, it is reasonable that diamond phase carbon can be achieved at room temperature and low local pressure by confined pulse laser deposition. For conventional pulse laser deposition, though the ablation of the target destroys the crystalline order and creates a high-energy plasma plume, the high laser intensity is still required due to the absence of a high-pressure condition.

Confined pulse laser deposition can synthesize metastable carbon materials. Diamond phase can be obtained at room temperature and low laser intensity because the vaporization and ionization of graphite reduces the dynamic barrier. Electrical measurement and Raman spectra characterization show that there is a shape transition between the graphite phase and the diamond phase when laser intensity is near 3.7 GW/cm$^2$. Considering its fast speed, easy fabrication and low cost, confined pulse laser deposition may be a candidate for syntheses of metastable material in the future.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. An apparatus for performing confined pulsed laser deposition at generally ambient room temperature and pressure, the apparatus comprising:
   a backing plane;
   an ablative coating placed on the backing plane;
   a transparent confinement layer attached to the backing plane, the transparent confinement layer having a top face and a bottom face the ablative coating being sandwiched between the backing plane and the bottom face of the transparent confinement layer;
   a laser beam directed to irradiate and ablate the ablative coating through the transparent confinement layer, the laser beam vaporizing the ablative coating into ionized plasma gas, the ionized plasma gas being confined between the confinement layer and the backing plane and generating a shock wave, the shock wave providing sufficient local pressure to synthesize a metaphase from the ablative coating;
   wherein the periphery of the ablative coating and the top face of the transparent confinement layer are exposed to the same atmosphere.

2. The apparatus of claim 1, wherein the ablative coating is a graphite coating, and the metaphase is diamond phase carbon.

3. The apparatus of claim 1, wherein the ablative coating is a metal.

4. The apparatus of claim 1, wherein the ablative coating is a thin film coating.

5. The apparatus of claim 1, further comprising a focus lens, the laser beam being directed through the focus lens to control the final spot size of the laser beam on the ablative coating.

6. The apparatus of claim 1, further comprising a beam diffuser, the laser beam being directed through the beam diffuser to make the laser beam intensity more uniform.

7. The apparatus of claim 1, further comprising an XYZ-stage to position a desired target area of the ablative coating to be irradiated by the laser beam.

8. The apparatus of claim 1, wherein the laser beam has an intensity of less than about 6 $GW/cm^2$.

9. The apparatus of claim 1, wherein the laser beam has an intensity of less than about 4 $GW/cm^2$.

10. The apparatus of claim 1, wherein the laser beam has an excitation wavelength of 568 nm.

* * * * *